Patented Nov. 25, 1930

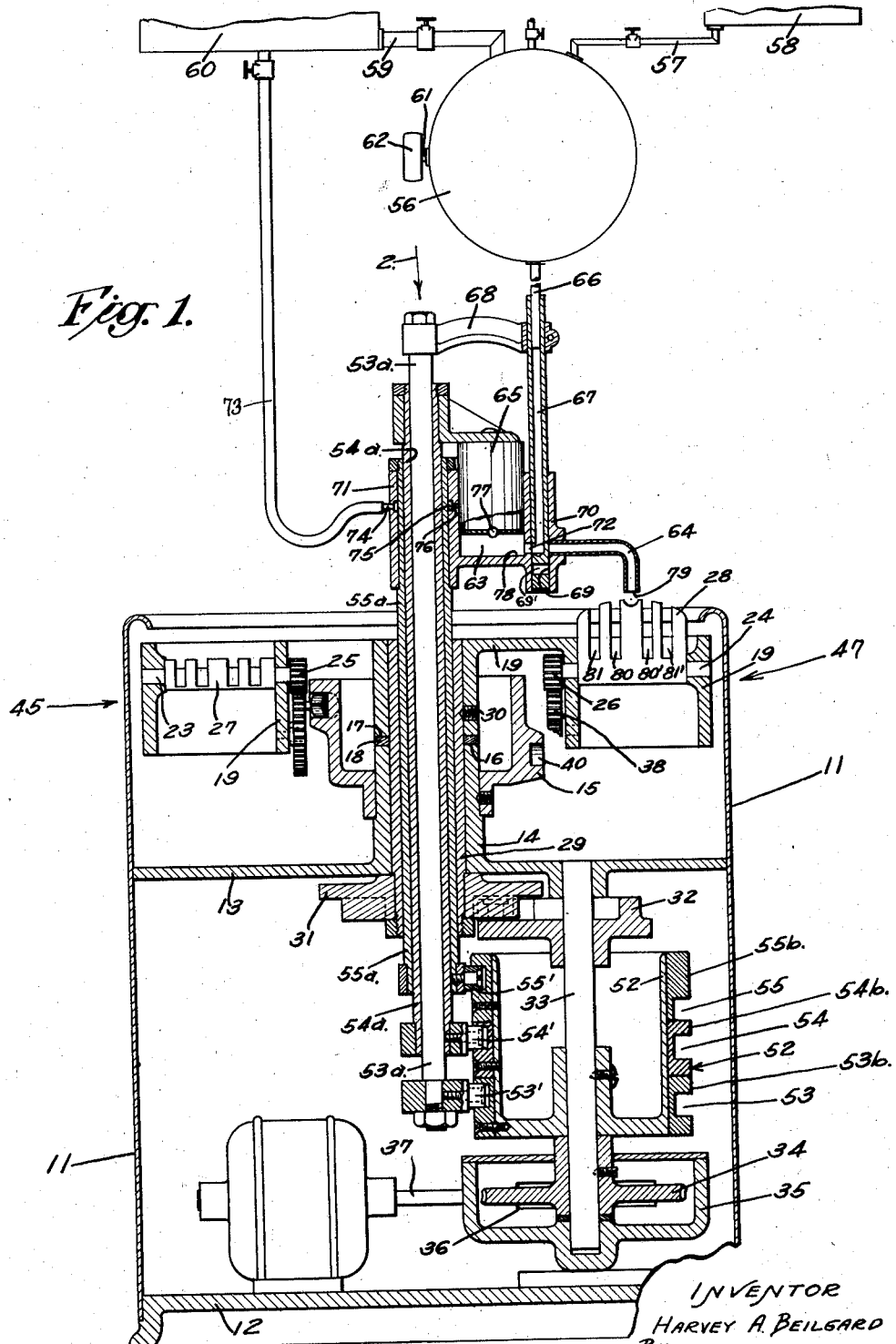

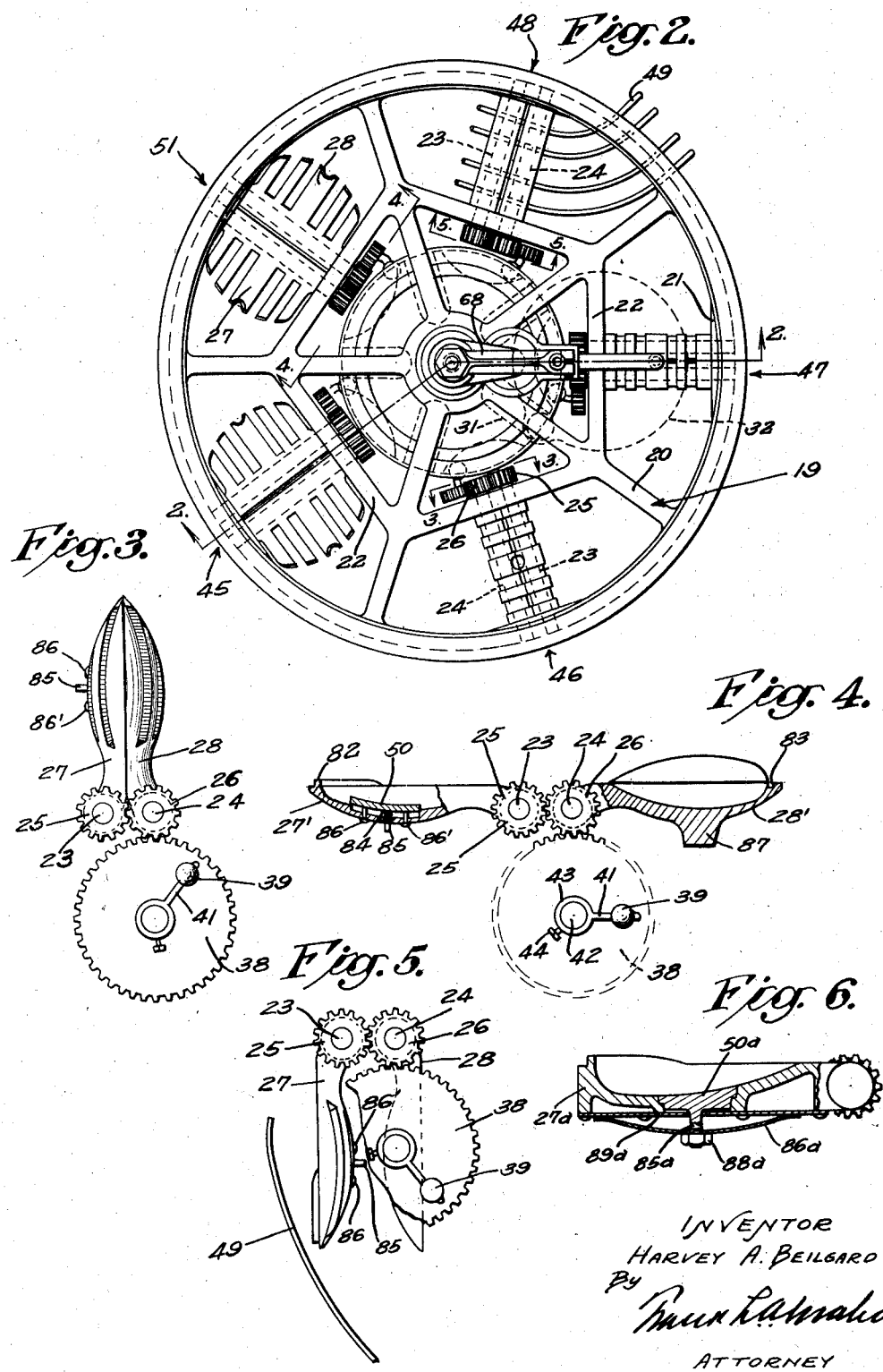

1,782,596

UNITED STATES PATENT OFFICE

HARVEY A. BEILGARD, OF HOLLYWOOD, CALIFORNIA

AUTOMATIC FOOD-UNIT-FILLING MACHINE

Application filed June 1, 1926. Serial No. 112,858.

It is an especial object of this invention to provide simple and efficient means for the production of edible units by filling of pastry shells, or the like, with a food composition, such as an ordinary or special ice cream,—the resultant products being optionally of the general character illustrated in my design application, Serial No. D-17,857, filed May 25, 1926, and suitable for vending in a coin-controlled apparatus of the general character described and claimed in my copending application, Serial No. 106,296, filed May 3, 1926.

It is an object of this invention to provide means and methods whereby baked pastry shells, or the like, may be received at one point, filled at another point and discharged at still another point, by a machine comprising parts movable in a closed path, such as a circular path; and, in preferred embodiments of my invention, said machine may include, within an outer cylinder serving as a main frame; (1) a spider rotatable therein and provided with separate pairs of mating concave members or "hands", adapted to co-operate in a holding (in an upright position) and in a subsequent discharge of successive shells (said concave members being provided with means for oppositely oscillating the same during the travel thereof); (2) means for rendering such travel intermittent; and (3) means for preparing, in a novel manner, and (4) for delivering, also in a novel manner, a suitably cooled edible composition (such as an ice cream) into openings in said shells,—said openings being either formed incidentally to the baking thereof or produced by the reciprocation of a nozzle, having a sharp edge, relatively thereto.

It is an object of this invention to provide a quill carrying a main spider (to which shafts carrying mating concave members are secured in pairs) with means for imparting intermittent rotation to said quill,—said quill being preferably mounted upon a concentric member which carries a stationary cam by which opposite oscillatory movements may be imparted to the respective concave members, to cause the same to open, at or in advance of a shell-receiving station, to close in advance of their arrival at a filling station, to swing to an emptying position upon or in advance of their arrival at a shell-dumping position; and to repeat these operations, with short rests at the mentioned stations, in a cyclical manner.

It is a further object of my invention to provide, in conjunction with the features of construction just referred to (or in conjunction with an equivalent organization) means comprising a plurality of longitudinally slidable concentric elements, preferably disposed within the mentioned quill and vertically movable by a master cam (which may be revolved by an intermediate shaft by whose constant rotation the mentioned quill is intermittently advanced) for feeding measured quantities of a chilled or other fluent food mixture (such as an ice cream composition containing carbon dioxide under pressure but still in slush form) through a nozzle and into the interior of successive pastry shells,—as the latter are successively brought to and held momentarily beneath said nozzle.

It is a further object of this invention to provide unique means and methods for the utilization of carbon dioxide, or the like, in the aeration and chilling of an ice cream composition, or the like, the release of pressure upon this composition being effective not only to produce the desired expansion of the cream and/or to contribute to its palatability (and/or to its preservation) but to chill the same to a temperature substantially below the freezing point of the mixture,—in a manner suitable to the described operations and to the vending of the resultant product within a machine of the general character described in one of my mentioned copending applications.

It is a further object of my invention to provide an organization whereby a cream mixture, or the like, and carbon dioxide, or the like, may be admixed, by agitation, within a chamber within which a considerable pressure is maintained, the resultant slush being advanced to a measuring compartment and there placed under a somewhat higher pressure of carbon dioxide in advance of or incidentally to its delivery, through a suitable nozzle, into successive pastry shells, or the like,—this last introduction of carbon dioxide being effective not only to increase the bulk of the product in a desired manner, but to lower the temperature to a desired degree.

Other objects of my invention, including a novel use of a feed pipe to the mentioned mixing chamber as a valve (so arranged that, in one position thereof, slush is admitted to said measuring compartment, the opening from said measuring compartment into said nozzle being closed when the mentioned passage into said mixing compartment is open) and including also the use of a novel construction whereby a central cam rod, an intermediate cam sleeve and an outer cam sleeve are successively employed in imparting timed reciprocatory movements respectively to a slush feed pipe serving also as a valve, to an expelling plunger within the mentioned measuring compartment, and to said compartment and the nozzle carried thereby, may be best appreciated from the following description of alternative embodiments of my invention, taken in connection with the appended claims and the accompanying drawings, in which Fig. 1 is, for the most part, a substantially central vertical section, parts at the top thereof being diagrammatically shown in elevation,—this view being taken substantially in the plane indicated by the broken line 2—2 of Fig. 2.

Fig. 2 is a top plan view taken substantially as indicated by the arrow 2 of Fig. 1.

Fig. 3 is a detail view, on an enlarged scale, taken substantially as indicated by the line 3—3 of Fig. 2,—mating concave shell-receiving members being shown as in closed position.

Fig. 4 is a detail view, taken substantially as indicated by the line 4—4, of Fig. 2 but showing certain optional features of modification hereinafter referred to.

Fig. 5 is a view comparable with Fig. 3, but taken substantially in the plane 5—5 of Fig. 2, and showing mating members of the type illustrated in Fig. 3 as in approximately their extreme open position.

Fig. 6 is a view corresponding to a left-hand portion of Fig. 4, but showing an alternative form.

Referring to the details of that specific embodiment of my invention chosen for purposes of illustration, 11 may be a substantially cylindrical or similar shell comprised in or constituting the main element of a frame supported from a base 12, this shell being transversely subdivided by a horizontal element 13, rigidly secured thereto and shown as integral with an upstanding bearing element 14 carrying a stationary cam 15 and terminating in a horizontal bearing shoulder 16, for engagement by an oppositely disposed shoulder 17 (any desired bearings 18 being interposed) upon a revoluble spider 19, or its equivalent. The spider 19 is shown as a one-piece member comprising radial elements 20 (see Fig. 2) curved outer members 21, and straight vertical webs 22, connecting the radial elements 20 in such manner as to form a rigid and rugged construction and to provide bearings for short parallel shafts 23 and 24, extending between the curved elements 21 and the adjacent straight elements 22,—the shafts 23 and 24 being respectively provided with gears 25 and 26 and with mating concave members 27, 28, adapted to receive pastry shells, or the like, holding the same in an upright position during a filling operation and subsequently discharging the same at a dumping station.

To impart suitable movements of relative approach and separation to the mating concave members 27, 28, or to equivalent shell-receiving members, during a horizontal transitory movement thereof, I may employ any suitable device operable by means of the stationary cam 15, or its equivalent. For example, assuming the spider 19 to be intermittently rotated (as by means of a quill 29 to which it is shown as secured by a set screw 30) said quill carrying one element 31 of a Geneva gear comprising the cooperating element 32 upon an intermediate shaft 33 (this shaft being shown as rotatable by a worm gear 34 within a housing 35, provided with a lateral aperture 36, to permit engagement between said worm gear 34 and a worm, not shown, upon a motor shaft 37) the relative rotation of the spider 19 may be utilized in imparting oscillatory movements to a gear 38, in constant engagement with one of the mentioned gears 23, 24,—as by providing the gear 38 directly or indirectly with a wrist pin or projecting part 39, engageable within a cam groove 40 in the mentioned stationary cam 15.

In order that the engagement of the wrist pin or part 39 within the cam groove 40 shall reliably but yieldably effect, at certain times, a tight closure between the mating concave elements 27, 28, even though particles of food material (as, edges of pastry shells) may be accidentally interposed therebetween, I prefer to connect the wrist pin 39 with the gear 38, or its equivalent, by resilient means such as a slightly flexible plate, blade or bar 41,—which may be secured relatively to the gear 38 or to a shaft 42 (as by means of a collar 43 carrying a set screw 44) in case the gear 38 is rigidly secured to the shaft 42, or its equivalent,—the latter being then freely rotatable, as within a vertical element 22 of the spider 19; and it should be understood that the configuration of the cam groove 40, or its equivalent, is intended to be such as to produce, incidentally to the interrupted rotative advance of the spider 19, an opening of each pair of concave elements at a filling station (as at 45, Fig. 2) this being followed by a complete or partial closing of the same (as at 46) in advance of arrival at a filling station 47 (filling being there effected by any suitable means, but preferably by means of the general character hereinafter described). The mating concave elements may thereafter be caused to separate through a position such as that illustrated in Fig. 4, and to swing downwardly into a position such as that illustrated in Fig. 5 by the time they arrive at a dumping station 48,—any preferred means (such as rake and guidance fingers 49 and/or a movably mounted plate or section 50, Fig. 4, as hereinafter described) being there employed to assure the dropping of a filled unit; and an additional stop at a cleaning station 51 may be utilized for any desired manual or mechanical cleaning or conditioning of the concave members 27, 28 (or 27', 28', in the case of the slightly modified type of concave members shown in Fig. 4).

To assure synchronization of the described movements of the spider 19 and of a plurality of pairs of mating concave elements for the manipulation of pastry shells, or the like, relatively to feeding operations (by which an ice cream mixture, or its equivalent, may be suitably delivered into the interiors thereof) I may employ means of the general character best illustrated in Fig. 1,—the intermediate shaft 33 being there shown as provided with a revoluble master cam 52, peripherally provided with separate cam grooves 53, 54, and 55,—respectively engageable by cam rollers 53', 54' and 55', respectively mounted upon a longitudinally slidable central cam rod 53ª, upon an intermediate cam sleeve 54ª, and upon an outer cam sleeve 55ª.

All of the mentioned roller-carrying elements are shown as vertically reciprocable, without rotation, within the mentioned quill 29; and above the described parts, or in any convenient relative position, I may provide an agitating chamber 56, of any preferred type, with means for the delivery thereto (as by way of a valved or other pipe 57, communicating with a tank 58) of a suitable cream or other edible mixture; and it is an important feature of my present invention that I also provide, as by means of a valved pipe 59 communicating with a tank 60, for the admission of carbon dioxide, under preferred pressure, into the agitating receptacle 56, or its equivalent,—the latter being adapted to operate under a pressure such as 30–40 pounds, although provided with mechanical agitating means,—not shown in detail, but operable by means such as a shaft 61 carrying a pulley 62.

Agitation of the cream mixture (which may initially fill the agitator receptacle 56, or its equivalent, about three-fourths full) with carbon dioxide released from a tank containing the same in liquid form (a limited quantity of the carbon dioxide being preferably passed through the agitator receptacle, in beginning the treatment of each batch, to wash air out) may not only effect a partial aeration of the ice cream but a cooling of the same to a temperature such as 20° F., and measured quantities of the resultant aerated and cooled mixture may be delivered, at desired intervals, to successive pastry shells (held at the filling station 47 or its equivalent, in the general manner described) by means such as a measuring cylinder or compartment 63, provided with a delivery nozzle 64 and reciprocable by the outer cam sleeve 55ª, or its equivalent,—the volume of this measuring compartment being variable by the relative reciprocation of an interfitting plunger 65, shown as carried by the intermediate cam element 54ª.

To deliver an ice cream slush, or the like, from the agitator receptacle 56, or its equivalent, into the measuring compartment 63, or its equivalent, and to control the outflow of a measured quantity thereof (without or with a further addition of carbon dioxide as hereinafter described) I may provide means such as a feed pipe comprising a fixed section 66 and a relatively movable section or pipe 67,— the latter being shown as movable by an arm 68 upon the upper end of the cam rod 53ª and as slidably reciprocable within a bore 69 in an extension 70, integral with a casting 71 in which the measuring compartment 63 is comprised,—the interior of the reciprocable section 67 of the feed pipe from the agitating chamber 56 being in communication with said measuring compartment by way of a lateral opening 72, the compartment 63 being alternatively in communication with nozzle 64 by means of bore 69' in the pipe 67.

It being desirable that the ice cream mixture, or its equivalent, as received into the measuring compartment 63, or its equivalent, shall be comparatively fluent, and desirable also that it shall be charged with sufficient additional carbon dioxide in the compartment 63 to bring the pressure up to (say) 60 pounds,—to facilitate discharge through the nozzle 64 and to effect a marked supercooling (as, to about 0° F.) when the last of the mixture is discharged into a pastry shell, or the like, pressure being then no longer maintained, I may provide, as by the use of an additional pipe comprising a flexible section 73, for the admission of carbon dioxide into the plunger 65,—one possible means for this purpose being suggested in Fig. 1 as comprising passages 74, 75 (annular) and 76 in the casting 71,—the last named passage being adapted to cooperate momentarily with an opening, of any desired length, in the relatively reciprocable hollow plunger 65; and the latter being optionally provided with an outlet valve 77, capable of momentary engagement with the bottom 78 of the compartment 63, or with other suitable unseating means.

The carbon dioxide may be confined in the receptacle 60, or its equivalent, under a pressure of some 900 pounds, more or less; but it is ordinarily desirable that the pressures in the agitating compartment 56 and the measuring compartment 63, or in the equivalents of these elements, be kept at a much lower level,—preferably not above 100 pounds; and it will be understood to be important that the configuration of the respective cam slots 53, 54, 55 be such as to cause a cyclical repetition of a relative movement whereby a cooled cream mixture, or the like, is admitted to the measuring chamber, during the rise of the plunger 65, or its equivalent, this preferably occurring during the descent of the nozzle 64 into a suitable aperture into a pastry shell, or the like (the extreme edge 79 of said nozzle being optionally sharpened to cut its own opening) the subsequent discharge of the cooled mixture (preferably with the indicated additional quantity of carbon dioxide, for a further cooling effect) being simultaneous with the relative upward withdrawal of the nozzle 64,—in such manner as to leave the mentioned shell completely filled and to carry the nozzle 64 out of the way in advance of a further rotation of the spider 19, to carry the successively filled food units toward the dumping station 48, or its equivalent.

Summarizing the mentioned filling operations, it will be understood that, the rotation of the spider 19 and parts carried thereby being intermittent, and parts thereabove being adapted to reciprocate without rotation, the cam slot 55 is so formed as to cause the nozzle 64 to descend into each pastry shell during an interval of rest at the filling station 47. An upward movement of the feed pipe 67, subsequent to a rise of plunger 65, may then close the opening 72 from said feed pipe and establish communication between the filled measuring compartment 63 and the nozzle 64 by way of a transverse bore shown below the opening 72,—and the completion of the delivery of the ice cream downward through said nozzle, as effected by a lowering of the plunger 65 and/or a momentary admission of additional $CO_2$ therethrough, is intended to be simultaneous with the upward withdrawal of said nozzle to upper position,—permitting advance of the spider 19, for a repetition of the above movements.

As to mode of operation, it will be clear from the foregoing that the described filling operations, or equivalent operations, are intended to occur during intervals of rest in the step-by-step cyclical advance of the spider 19, or an equivalent member of a shell-handling organization; but, commenting that the number of stations in a closed series provided in the general manner described may be equal to or exceed the numbers of pairs of concave members or "hands" 27, 28: (five such pairs being shown) and upon the fact that many features of the described organization are suitable for use in the handling and filling of units other than pastry shells, I desire, at this point, to emphasize the fact that, although I show said concave elements or hands as provided with kerfs or slots (as at 80, 80', 81 and 81') in planes approximately at right angles to the axes of shafts 23, 24 (when these axes are parallel, and not identical) I do not necessarily rely upon means such as the rakes 49 for the removal of filled pastry shells or other units from said concave elements or hands.

Whether I use kerfed hands (or "entire" hands of the alternative character shown at 27', 28', Fig. 4—these latter being of a type suitable for use also, when provided with external resistance heating elements, in the forming and baking of pastry shells, in a machine generally similar to that described) I may equip one of the mating concave members or hands (which may advantageously be formed of aluminum, or the like) with interfitting means (such as a curved ridge or prominence 82, upon one of said members,—adapted to project within a corresponding depression 83 in the other of said members) and/or with dump-assuring means (such as a spring or springs 84, shown as surrounding the pin 85) beneath the relatively movable section 50, or its equivalent,—the inward movement of this section being optionally limited by means such as an additional pin or pins 86, 86' having external heads.

By using a construction of the general character described, I may effect an automatic lifting of the plate 50, at the moment when the concave members separate,—to cause the filled (or baked) shell to remain with the (preferably shallower) concave member 28'; and, to provide positive means for disengaging the (baked or) filled shell even in case it shall so adhere as to prevent the described automatic movement of the plate 50, or its equivalent, I may provide, as upon the back of the cooperating concave element 28', or its equivalent, means such as a prominence 87,—the impact of this prominence on the pin 85, or its equivalent, during the advance of a pair of concave elements toward a dump station 48 being relied upon invariably to dislodge any shell or unit which has remained adherent; and, in any case, the dislodged shell or unit may descend by way of a suitable guide or chute, as by way of a curved chute provided by or connected with the rake 49, to a point or points of exit and/or decoration and/or wrapping and/or storage or use.

Alternatively, in case I prefer to retain the filled shells or units, up to the moment of their delivery, within the deeper of the concave elements, I may substitute, as suggested in Fig. 6 an outwardly-acting spring (such as a leaf spring 86ª) for the compression spring 86 shown in Fig. 4—this leaf spring being then relied on not only to hold the plate or section 50ª down during loading and filling operations, but to return the same to its illustrated position after the pin 85ª (shown as carrying a head 88ª) has been struck by prominence such as that shown at 87, Fig. 4. The concave element 27ª may or may not occupy leading position, with reference to the direction of its advance; and, in case the concave elements are provided with bodies externally flanged to receive heating elements (not shown) and/or insulating compositions (not shown) the spring 86ª, or its equivalent may either constitute or engage a back-closure plate—a non-integral back-closure plate being shown at 89ª, Fig. 6.

It will be obvious that, just as I may rely upon manual feeding of empty shells or units at station 45, so I may rely upon manual means for the removal of filled shells or units at or near station 48, or its equivalent; and it will be obvious also that I may increase the capacity of my machines, or adapt a single machine to serve both a baking function and a filling function, by increasing the number and varying the equipment of stations; but, in preference to duplicating in a single machine the feeding and discharging features described (each unit of the indicated type being in fact suitable to turn out some 1140 food units per hour) I prefer to combine or associate baking and filling units in the general manner set forth in a companion application, Serial No. 176,986, filed March 21, 1927. Obviously, I may gain desired total capacity by the use of similar machines up to the required total; and it is an important merit of the described organization that it permits the automatic and rapid handling of my novel pastry or confection shells, or the like, regardless of whether the same are initially provided or unprovided with filling openings. Since all operations required for filling may be automatically repeated during each "dwell" in a step-by-step cyclical movement, the filled products (whether hot or cold) need not be "touched by human hands" before they are sold; and, by forming the body of the master cam 52, or its equivalent, of a cylindrical central element 52ª surrounded by relatively adjustable separate slot-carrying elements 53ᵇ, 54ᵇ and 55ᵇ, I may provide for any desired changes in the intervals of rest and relative motion of the described parts of my filling organization, actuated therefrom, or for the requirements of various materials or operations analogous to those described, but differing substantially therefrom,—as, for the production of any desired hot or cold product including an edible shell and an edible filling therefor—the products being of any one of a great variety of sizes and shapes and being subsequently heated or cooled to any desired degree.

Although I have herein described a single complete embodiment of my invention, it should be understood not only that various features thereof may be independently used but also that numerous modifications might be made by those skilled in the art to which this case relates, without the slightest departure from the spirit and scope of this invention, as the same is indicated above and in the following claims.

I claim as my invention:

1. An organization for the production of edible units comprising: a filling nozzle; means for holding a pastry shell, or the like, relatively to said nozzle; means producing relative movements of insertion and withdrawal between said nozzle and said shells; and means for ejecting a filling material, through said nozzle, during a withdrawal movement thereof, said nozzle being provided with a cutting edge, and said holding means being movable between an open position and a closed position and so shaped as to permit said relative movement of insertion and withdrawal while closed.

2. An organization for the production of edible units comprising: means for holding a hollow pastry shell, having a restricted opening, in a filling position; a separate measuring compartment for holding filling material; a restricted filling nozzle in intermittent communication with said compartment; nozzle moving means for inserting and withdrawing said restricted nozzle into and out of said restricted opening; means for keeping said holding means stationary during insertion and withdrawal of said nozzle; and means for ejecting a filling material from said nozzle into said hollow shell during a withdrawal movement of the nozzle.

3. An organization of the general character defined in claim 2, in which said measuring compartment is bodily movable relative to said shell-holding means.

4. An organization of the general character defined in claim 2, in which said measuring compartment is bodily movable relative to said shell-holding means; and in which means is provided for synchronizing the movement of said measuring means relative to movements of said shell-holding means.

5. An organization of the general character defined in claim 2 in which said measuring compartment is bodily movable relatively to said shell-holding means, and in which means are provided for synchronizing the movements of said measuring means relatively to movements of said shell-holding means so that said nozzle is inserted and withdrawn during intervals of rest of said shell-holding means, and said holding means being movable between an open position and a closed position and so shaped as to permit said relative movement of insertion and withdrawal while closed.

6. An organization of the general character defined in claim 2 in which said compartment is provided with means for releasing a gas therein.

7. In means for the preparation of frozen food units comprising pastry shells, a shell-manipulating organization comprising: mating concave members each pivoted on a separate axis and having interior surfaces corresponding in contour with the exterior surfaces of said shells; means for advancing the pivots of said concave members relatively to a filling station and a releasing station; and means for imparting opposite movements of relative rotation to said concave members, to close the same and hold them closed during approach to said filling station, and to open the same during a subsequent advance toward said releasing station.

8. An organization of the general character defined in claim 7 in which said concave members are mounted upon separate shafts, each provided with means to impart rotation thereto.

9. An organization of the general character defined in claim 7 in which said concave members are mounted upon separate shafts, each provided with means to impart rotation thereto, said last-mentioned means comprising intermeshed gears.

10. An organization of the general character defined in claim 7 in which said concave members are oppositely movable, during a movement of translation, by means comprising a cam.

11. An organization of the general character defined in claim 7 in which said concave members are oppositely movable by means comprising intermeshed gears upon parallel shafts constituting said pivots and an additional gear provided with means for oscillating the same.

12. An organization of the general character defined in claim 7 in which said concave members are oppositely movable by means comprising intermeshed gears upon parallel shafts constituting said pivots and an additional gear provided with means for oscillating the same, said oscillating means comprising a resilient member.

13. An organization of the general character defined in claim 7 in which said concave members are oppositely movable by means comprising intermeshed gears upon parallel shafts constituting said pivots and an additional gear provided with means for oscillating the same, said oscillating means comprising a cam and a resilient member constituting a crank movable by said cam.

14. An organization of the general character described comprising: mating unit-holding members each pivoted on a separate shaft, and having interior surfaces corresponding in contour with the exterior surfaces of a shell; means for imparting successive translatory movements thereto in a closed path; means for feeding a fluent material into said units; and means for imparting opposite pivotal movements to said unit holding members during such translatory movements.

15. An organization of the general character described comprising: mating unit-holding members each pivoted on a separate shaft, and having interior surfaces corresponding in contour with the exterior surfaces of a shell; means for imparting successive translatory movements thereto in a closed path; means for feeding a fluent material into said units; and means for imparting opposite pivotal movements to said unit holding members during such translatory movements,—said last mentioned means comprising an oscillatory member.

16. An organization of the general character described comprising: mating unit-holding members; means for imparting successive translatory movements thereto in a closed path; means for feeding a fluent material into said units; and means for imparting opposite pivotal movements to said units during such translatory movements,—said last mentioned means comprising an oscillatory member in the form of a gear.

17. An organization of the general character described comprising: mating unit-holding members; means for imparting successive translatory movements thereto in a closed path; means for feeding a fluent material into said units; and means for imparting opposite pivotal movements to said units during such translatory movements,—said last mentioned means comprising an oscillatory member in the form of a gear provided with a crank.

18. An organization of the general character described comprising: mating unit-holding members; means for imparting successive translatory movements thereto in a closed path; means for feeding a fluent material into said units; and means for imparting opposite pivotal movements to said units during such translatory movements,—said last mentioned means comprising an oscillatory member in the form of a gear provided with a crank including a resilient arm terminating in a wrist pin.

19. An organization of the general character described comprising: mating unit-holding members; means for imparting successive translatory movements thereto in a closed path; means for feeding a fluent material into said units; and means for imparting opposite pivotal movements to said units during such translatory movements,—said last mentioned means comprising an oscillatory member in the form of a gear provided with a crank including a resilient arm terminating in a wrist pin, and said wrist pin being received within a groove in a cam member disposed substantially parallel with said closed path.

20. In an organization of the general character described: mating concave members provided with pivots carrying gears for imparting opposite pivotal movements thereto; and means tending to separate a pastry shell, held therebetween, from one of said concave members.

21. In an organization of the general character described: mating concave members provided with pivots carrying gears for imparting opposite pivotal movements thereto; and means tending to separate a pastry shell, held therebetween, from one of said concave members, said separating means comprising a plate which is resiliently held.

22. In an organization of the general character described: mating concave members provided with means for imparting opposite pivotal movements thereto; and means tending to separate a pastry shell, held therebetween, from one of said concave members,—said separating means comprising a plate, disposed within one of said members, and means, on the other of said members, for imparting relative movement to said plate.

23. In an organization of the general character described: a frame carrying a spider which is provided with relatively movable unit-engaging members; a filling organization thereabove; a motor; a quill rotatable upon a central bearing and carrying said spider; means, comprising an upright shaft, for imparting intermittent rotation to said quill; and means extending through said quill, for operating said filling organization.

24. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization operable by means extending through said quill and relatively reciprocable therein.

25. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization positioned thereabove and comprising members which are movable through said quill.

26. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization positioned thereabove and comprising members which are movable through said quill by cam means carried by said shaft.

27. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization comprising reciprocating parts mounted above said quill, said shaft being provided with cam means to impart various reciprocatory movements to said parts of said filling organization, and interconnecting means operable by said motor for operating said cam means.

28. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization comprising a member which provides a measuring chamber operable by means reciprocable through said quill.

29. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization comprising a member which provides a measuring chamber, and said measuring chamber being reciprocable by means movable within said quill.

30. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization supported by said upright shaft above said quill and comprising a member which provides a measuring chamber carrying a nozzle operable by means reciprocable through said quill.

31. In an organization of the general character described: a frame carrying a spider which is provided with relatively movable unit-engaging members; a motor; a quill rotatable upon a central bearing element and carrying said spider; means, including an upright shaft, for imparting intermittent rotation from said motor to said quill; and a filling organization reciprocably mounted above said spider comprising a measuring chamber which is provided with a nozzle member serving also for the reception of a valve.

32. In an organization of the general character described: a frame carrying a spider which is provided with relatively movable unit-engaging members; a motor; a quill rotatable upon a central bearing and carrying said spider; means, comprising an upright shaft, for imparting intermittent rotation to said quill; and a filling organization comprising a measuring chamber which is provided with a nozzle member receiving a valve and reciprocable by means movable within said quill.

33. In an organization of the general character described: a frame carrying a spider which is provided with relatively movable unit engaging members; a motor; a quill rotatable upon a central bearing and carrying said spider; means, comprising an upright shaft, for imparting intermittent rotation to said quill; and a filling organization comprising a measuring chamber which is provided with means for varying the capacity thereof,—said last-mentioned means being reciprocable by means movable within said quill.

34. An organization of the general character defined in claim 24 in which said filling organization is provided with means for releasing a condensed gas within a part thereof.

35. An organization of the general character defined in claim 24 in which said filling organization comprises a measuring compartment, an inlet member serving as a valve, and a member varying the capacity of said measuring chamber,—said measuring chamber, said inlet member and said capacity-varying member being respectively reciprocable by concentric members which are relatively movable within said quill.

36. An organization of the general character defined in claim 24 in which said filling organization comprises a measuring compartment, an inlet member serving as a valve, and a member varying the capacity of said measuring chamber,—said measuring chamber, said inlet member and said capacity-varying member being respectively reciprocable by concentric members which are relatively movable within said quill, said concentric members being respectively provided with projections engageable within grooves upon a cam member secured to said upright shaft.

37. A method of preparing chilled units which comprises: mixing a fluent edible material with carbon dioxide which has been kept under a pressure sufficient to maintain it in liquid form and to produce a cooling of the mixture upon release of such pressure; and advancing said mixture, while still fluent, into edible shells adapted to be filled therewith.

38. A method of preparing chilled units which comprises: mixing a fluent edible material with carbon dioxide which has been kept under a pressure sufficient to maintain it in liquid form and to produce a cooling of the mixture upon release of such pressure; and advancing said mixture, while still fluent, into edible shells adapted to be filled therewith; a final delivery of said mixture being effected during a withdrawal movement of a filling member from a shell.

39. A method of preparing chilled units which comprises: mixing a fluent edible material with carbon dioxide which has been kept under a pressure sufficient to maintain it in liquid form and to produce a cooling of the mixture upon release of such pressure; and advancing said mixture, while still fluent, into edible shells adapted to be filled therewith, additional carbon dioxide being added to said mixture at a point between said mixing and said final delivery.

40. A method of preparing chilled units which comprises: mixing a fluent edible material with carbon dioxide which has been kept under a pressure sufficient to maintain it in liquid form and to produce a cooling of the mixture upon release of such pressure; and advancing said mixture, while still fluent, into edible shells adapted to be filled therewith,—said mixture being further cooled incidentally to its final delivery into said shells.

In testimony whereof, I have hereunto set my hand at Los Angeles, California, this 25th day of May, 1926.

HARVEY A. BEILGARD.